US008738628B2

(12) United States Patent
Jin et al.

(10) Patent No.: US 8,738,628 B2
(45) Date of Patent: May 27, 2014

(54) COMMUNITY PROFILING FOR SOCIAL MEDIA

(75) Inventors: Hongxia Jin, San Jose, CA (US); Yan Liu, Los Angeles, CA (US); Wenjun Zhou, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/485,510

(22) Filed: May 31, 2012

(65) Prior Publication Data

US 2013/0325866 A1 Dec. 5, 2013

(51) Int. Cl.
*G06F 7/00* (2006.01)
*G06F 17/30* (2006.01)

(52) U.S. Cl.
USPC .......... 707/740

(58) Field of Classification Search
USPC .......... 707/737, 740; 705/319
See application file for complete search history.

(56) References Cited

U.S. PATENT DOCUMENTS

| | | | | |
|---|---|---|---|---|
| 7,853,485 | B2 * | 12/2010 | Song et al. | 705/26.1 |
| 7,958,120 | B2 * | 6/2011 | Muntz et al. | 707/736 |
| 8,090,665 | B2 * | 1/2012 | Yang et al. | 705/319 |
| 2003/0033333 | A1 * | 2/2003 | Nishino et al. | 707/531 |
| 2003/0182310 | A1 * | 9/2003 | Charnock et al. | 707/104.1 |
| 2005/0131916 | A1 * | 6/2005 | Banatwala et al. | 707/100 |
| 2006/0026680 | A1 * | 2/2006 | Zakas | 726/22 |
| 2008/0133501 | A1 * | 6/2008 | Andersen et al. | 707/5 |
| 2008/0240379 | A1 * | 10/2008 | Maislos et al. | 379/88.13 |
| 2008/0256553 | A1 * | 10/2008 | Cullen | 719/313 |
| 2008/0295000 | A1 * | 11/2008 | Kieselbach et al. | 715/752 |
| 2009/0063557 | A1 * | 3/2009 | MacPherson | 707/103 R |
| 2009/0100469 | A1 * | 4/2009 | Conradt et al. | 725/46 |
| 2009/0125580 | A1 * | 5/2009 | Canning et al. | 709/203 |
| 2009/0164417 | A1 * | 6/2009 | Nigam et al. | 707/2 |
| 2009/0177484 | A1 * | 7/2009 | Davis et al. | 705/1 |
| 2009/0204609 | A1 * | 8/2009 | Labrou et al. | 707/5 |
| 2009/0307630 | A1 * | 12/2009 | Kawai et al. | 715/810 |

(Continued)

OTHER PUBLICATIONS

Duan et al., MEI: Mutual Enhanced Infinite Generative Model for Simultaneous Community and Topic Detection, Discovery Science. Proc 14th Intl Conf., DS 2011, pp. 91-106, Espoo, Finland, Oct. 5-7, 2011.

(Continued)

*Primary Examiner* — Robert Beausoliel, Jr.
*Assistant Examiner* — Nicholas Allen
(74) *Attorney, Agent, or Firm* — Lieberman & Brandsdorfer, LLC

(57) ABSTRACT

Embodiments of the invention relate to modeling communities associated with groups of data items. Tools are provided to iteratively assign data items to communities and to update topic and participant distribution in the assigned communities. As the distributions are updated, the characteristics of the communities are updated. Each activity area is defined from the perspective of a single user. Participants in a community are connected to a user, but not necessarily to each other. The combination of formations of communities and the statistical aspect of evaluating characteristics of the communities provides a multi-facetted organization of connections between data items and associated participants.

16 Claims, 18 Drawing Sheets

100

(56) References Cited

U.S. PATENT DOCUMENTS

| | | | | |
|---|---|---|---|---|
| 2010/0070485 | A1* | 3/2010 | Parsons et al. | 707/709 |
| 2010/0100546 | A1* | 4/2010 | Kohler | 707/739 |
| 2010/0325107 | A1* | 12/2010 | Kenton et al. | 707/723 |
| 2011/0010182 | A1* | 1/2011 | Turski et al. | 705/1.1 |
| 2011/0055196 | A1* | 3/2011 | Sundelin et al. | 707/711 |
| 2011/0067037 | A1* | 3/2011 | Kawai et al. | 719/314 |
| 2011/0153595 | A1* | 6/2011 | Bernstein et al. | 707/722 |
| 2011/0153686 | A1* | 6/2011 | Campbell et al. | 707/812 |
| 2011/0161377 | A1* | 6/2011 | Reed et al. | 707/803 |
| 2011/0179114 | A1* | 7/2011 | Dilip et al. | 709/204 |
| 2011/0184955 | A1* | 7/2011 | Mitchell et al. | 707/740 |
| 2011/0276581 | A1* | 11/2011 | Zelevinsky | 707/766 |
| 2011/0295612 | A1* | 12/2011 | Donneau-Golencer et al. | 705/1.1 |
| 2012/0059813 | A1* | 3/2012 | Sejnoha et al. | 707/707 |
| 2012/0216248 | A1* | 8/2012 | Alperovitch et al. | 726/1 |
| 2012/0221638 | A1* | 8/2012 | Edamadaka et al. | 709/204 |
| 2013/0007137 | A1* | 1/2013 | Azzam et al. | 709/206 |
| 2013/0007317 | A1* | 1/2013 | Seo et al. | 710/63 |
| 2013/0097176 | A1* | 4/2013 | Khader et al. | 707/748 |
| 2013/0291126 | A1* | 10/2013 | Thomson | 726/30 |

OTHER PUBLICATIONS

Sachan et al., Probabilistic Model for Discovering Topic Based Communities in Social Networks, CIKM '11 Proc of the 2011 ACM Intl Conf. on Information and Knowledge Management, Glasgow, Scotland, pp. 2349-2352, Oct. 24-28, 2011.

Ereteo et al., SemTagP: Semantic Community Detection in Folksonomies, 2011 IEEE/WIC/ACM Intl Joint Conf on Web Intelligence (WI) and Intelligent Agent Technology, pp. 324-331, Lyon, France, Aug. 22-27, 2011.

Salem et al., Discovering Communities in Social Networks Using Topology and Attributes, 2011 10th Intl Conf on Machine Learning and Applications, pp. 40-43, Honolulu, Dec. 18-21, 2011.

Sharma et al., DRank: Decentralized Ranking Mechanism for Semantic Community Overlays, Fourth Intl Conf on Communication Systems and Networks, Bangalore, India, Jan. 3-7, 2012.

Zhao et al., Detection of Multi-Relations Based on Semantic Communities Behaviors, Proc ICSSSM '07, 2007 Intl Conf on Service Systems and Service Management, Dec. 1, 2007.

* cited by examiner

400

500

510 520 530 540

| | | Activeness | Topics | | | | People | | | |
|---|---|---|---|---|---|---|---|---|---|---|
| | | | 1 | 2 | • • • | K | 1 | 2 | • • • | P |
| Community | 1 | $\psi_1$ | $\theta_{11}$ | $\theta_{12}$ | • • • | $\theta_{1K}$ | $\eta_{11}$ | $\eta_{21}$ | • • • | $\eta_{1P}$ |
| | 2 | $\psi_2$ | $\theta_{21}$ | $\theta_{22}$ | • • • | $\theta_{2K}$ | $\eta_{21}$ | $\eta_{22}$ | • • • | $\eta_{2P}$ |
| | • • • | • • • | • • • | • • • | • • • | • • • | • • • | • • • | • • • | • • • |
| | C | $\psi_C$ | $\theta_{C1}$ | $\theta_{C2}$ | • • • | $\theta_{CK}$ | $\eta_{C1}$ | $\eta_{C2}$ | • • • | $\eta_{CP}$ |

FIG. 5

600

610

| | | Unique Words (a.k.a. Type) | | | |
|---|---|---|---|---|---|
| | | 1 | 2 | • • • | V |
| Topic | 1 | $\phi_{11}$ | $\phi_{21}$ | • • • | $\phi_{V1}$ |
| | 2 | $\phi_{12}$ | $\phi_{22}$ | • • • | $\phi_{V2}$ |
| | • • • | • • • | • • • | • • • | • • • |
| | K | $\phi_{1K}$ | $\phi_{2K}$ | • • • | $\phi_{VK}$ |

620

FIG. 6

700

710 720 730

| | | Activeness | Topics | | | | People | | | |
|---|---|---|---|---|---|---|---|---|---|---|
| | | | 1 | 2 | ••• | K | 1 | 2 | ••• | P |
| Community | 1 | $\psi_1^{(0)} = \frac{1}{C}$ | $\theta_{11}^{(0)} = \frac{1}{K}$ | $\theta_{12}^{(0)} = \frac{1}{K}$ | ••• | $\theta_{1K}^{(0)} = \frac{1}{K}$ | $\eta_{11}^{(0)} = \frac{1}{2}$ | $\eta_{12}^{(0)} = \frac{1}{2}$ | ••• | $\eta_{1P}^{(0)} = \frac{1}{2}$ |
| | 2 | $\psi_2^{(0)} = \frac{1}{C}$ | $\theta_{21}^{(0)} = \frac{1}{K}$ | $\theta_{22}^{(0)} = \frac{1}{K}$ | ••• | $\theta_{2K}^{(0)} = \frac{1}{K}$ | $\eta_{21}^{(0)} = \frac{1}{2}$ | $\eta_{22}^{(0)} = \frac{1}{2}$ | ••• | $\eta_{2P}^{(0)} = \frac{1}{2}$ |
| | ••• | ••• | ••• | ••• | ••• | ••• | ••• | ••• | ••• | ••• |
| | C | $\psi_C^{(0)} = \frac{1}{C}$ | $\theta_{C1}^{(0)} = \frac{1}{K}$ | $\theta_{C2}^{(0)} = \frac{1}{K}$ | ••• | $\theta_{CK}^{(0)} = \frac{1}{K}$ | $\eta_{C1}^{(0)} = \frac{1}{2}$ | $\eta_{C2}^{(0)} = \frac{1}{2}$ | ••• | $\eta_{CP}^{(0)} = \frac{1}{2}$ |

740

FIG. 7

800

810

| | | Unique Words (a.k.a. Type) | | | |
|---|---|---|---|---|---|
| | | 1 | 2 | ••• | V |
| Topic | 1 | $\phi_{11}^{(0)} = \frac{1}{V}$ | $\phi_{21}^{(0)} = \frac{1}{V}$ | ••• | $\phi_{V1}^{(0)} = \frac{1}{V}$ |
| | 2 | $\phi_{12}^{(0)} = \frac{1}{V}$ | $\phi_{22}^{(0)} = \frac{1}{V}$ | ••• | $\phi_{V2}^{(0)} = \frac{1}{V}$ |
| | ••• | ••• | ••• | ••• | ••• |
| | K | $\phi_{1K}^{(0)} = \frac{1}{V}$ | $\phi_{2K}^{(0)} = \frac{1}{V}$ | ••• | $\phi_{VK}^{(0)} = \frac{1}{V}$ |

820

FIG. 8

900

930

910

920

| Community: $C_d$ | | Frequency | Frequency of Each Type Assigned to Each Topic | | | |
|---|---|---|---|---|---|---|
| | | | 1 | 2 | • • • | V |
| Topic | 1 | $d.n_1$ | $d.n_{11}$ | $d.n_{21}$ | • • • | $d.n_{V1}$ |
| | 2 | $d.n_2$ | $d.n_{12}$ | $d.n_{22}$ | • • • | $d.n_{V2}$ |
| | • • • | • • • | • • • | • • • | • • • | • • • |
| | K | $d.n_K$ | $d.n_{1K}$ | $d.n_{2K}$ | • • • | $d.n_{VK}$ |
| People | 1 | $d.m_1$ | | | | |
| | 2 | $d.m_2$ | | | | |
| | • • • | • • • | | | | |
| | P | $d.m_P$ | | | | |

FIG. 9

1000

1010

| NumDocs = $D_c$ | | Frequency |
|---|---|---|
| Topic | 1 | $c.n_1$ |
| | 2 | $c.n_2$ |
| | • • • | • • • |
| | K | $c.n_K$ |
| People | 1 | $c.m_1$ |
| | 2 | $c.m_2$ |
| | • • • | • • • |
| | P | $c.m_P$ |

1020

FIG. 10

1100

1110

| | | Frequency of Each Type Being Assigned to Each Topic | | | |
|---|---|---|---|---|---|
| | | 1 | 2 | ••• | V |
| Topic | 1 | $n_{11}$ | $n_{21}$ | ••• | $n_{V1}$ |
| | 2 | $n_{12}$ | $n_{22}$ | ••• | $n_{V2}$ |
| | ••• | ••• | ••• | ••• | ••• |
| | K | $n_{1K}$ | $n_{2K}$ | ••• | $n_{VK}$ |

1120

FIG. 11

COMMUNITY PROFILING FOR SOCIAL MEDIA

BACKGROUND

This invention relates to clustering of data items. More specifically, the invention relates to discovering communities from disparate data items and providing a multi-dimensional analysis of the discovered communities and associated data items.

With the rapid development of online social network and collaboration systems, social connection among people is on the rise. Either for personal use or business use, social media has become a ubiquitous tool for daily social communication. Social media comes in different forms, and generally consists of documents shared among two or more people. For example, an update may be created by a person and broadcast to friends or followers through a social connection platform.

One task in social network analysis includes identification of an underlying community structure. A community may be in the form of a group of people who are closely linked in a social network, or those who share common interests, but do not necessarily interact directly with each other. Current formations of social linkages among virtual communities are limited. More specifically, such formations are two dimensional and limited to a collapsed evaluation of relationships by calculating an existence or strength between any two entities.

BRIEF SUMMARY

This invention comprises a system and computer program product for organizing data items into communities, and dynamically modifying the composition of the communities based on inherent characteristics of the data items within the formed communities.

In one aspect, a computer program product is provided for use with electronic communication data. The computer program product includes a computer readable nontransitory storage medium having computer readable program code embodied therewith. Computer readable program code is configured to initialize a plurality of communities. Each community is defined as a grouping of interconnected participants and includes at least one topic and two or more participants. Program code is provided to iteratively assign each communication item under consideration into one of the communities and to update a distribution of topics and participants in each of the communities in response to the assigned communication. Program code is similarly provided to update a topic assignment for each of the words from the assigned communication. Based on the updated distribution of topics and participants, computer readable program code is further provided to profile each of the communities. As described above, the computer readable program code is designed for the purpose of communication organization through the creation of communities, and for providing analysis of the communications and communities based on their associated characteristics and content.

In a further aspect, a system is provided with a shared pool of configurable resources. The shared pool includes a physical host in communication with a plurality of physical machines; the physical host has a processing unit in communication with a memory module and data storage. Tools are provided in the system to support organizing communications, discovering communities from the communications, and providing an analysis of the communications and discovered communities. A processing unit is provided in the system in communication with a memory module and storage media to organize and maintain communications. A functional unit is provided local to the memory module and in communication with the processing unit. The functional unit includes tools that include, but are not limited to, an initialization manager, an assignment manager, an update manager, and a profile manager. The initialization manager initializes communities, with each community being a defined grouping of interconnected participants and having at least one topic and at least two participants. The assignment manager, which is in communication with the initialization manager, iteratively assigns each communication into one of the initialized communities. The update manager, which is in communication with the assignment manager, updates a distribution in each of the communities including responding to the assignment of the received data item, a distribution of participants in each of the communities, and a topic assignment for each word from the assigned data items. The profile manager, which is in communication with the update manager, profiles each of the communities based on the updated distribution of topics and participants. The combination of these system components allows for the organization of data items by creation and analysis of communities.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

FIG. 5 depicts a chart representing the initialization and maintenance of activeness, topics, and people with respect to each community.

FIG. 6 depicts a chart representing the initialization of unique words with respect to each topic.

FIG. 7 depicts a chart representing initial values for activeness, topics, and people, with respect to a community and prior to looking at any training data.

FIG. 8 depicts a chart representing initial values for unique words with respect to topics and prior to looking at any training data.

FIG. 9 depicts a chart representing statistics for topics, people and frequency of unique words assigned to each topic for a document.

FIG. 10 depicts a chart representing statistics for frequency of topics for each community for a document.

FIG. 11 depicts a chart representing the total number of times each unique word is assigned to each topic for a document.

DETAILED DESCRIPTION

Figure 1:
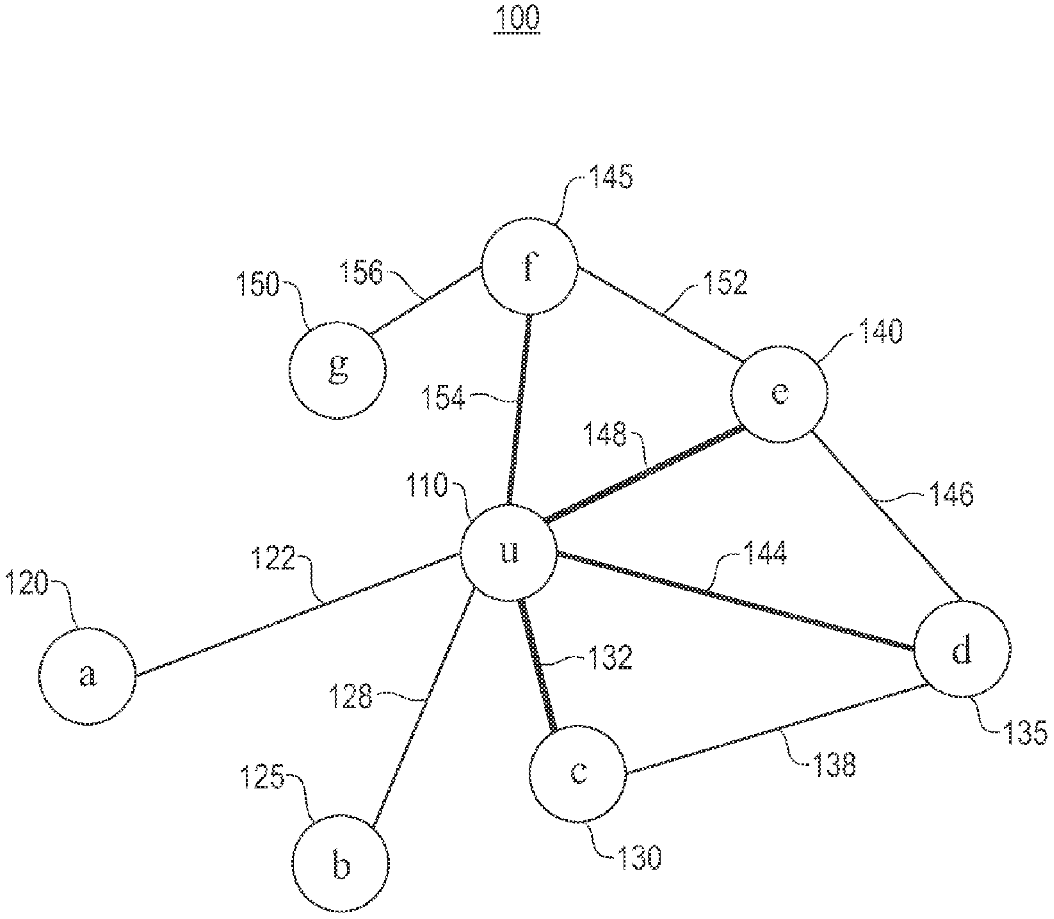
FIG. 1 depicts a single facetted view of social connections among users.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit(s) described in this specification has been labeled with tools in the form of managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a profile manager, a cluster manager, a partition manager, a merge manager, an activity manager, an assignment manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Participants in electronic communication are referred to as senders or receivers depending on the origination of the communication. Participants may interact on related topics with different groups of participants, and they may also communicate to the same group of participants on different topics. As such, the social link between a pair of participants may have multiple layers. At the same time, the social network is dynamic in nature. Accordingly, a profiling model for electronic communications and participant involvement needs to capture the formation of communities among participants together with how such communities evolve.

There are at least three categories of electronic communication that include a sender and receiver, including social media communications, electronic mail communications, and collaborative content. With respect to social media, a communication is created by a user and broadcast to one or more receivers who may view and/or respond to the communication. The communication may be visible to a plurality of recipients, of which one or more may make an active response. Those active responses indicate interest and relevance pertaining to each recipient of the communication.

An electronic mail communication may also be considered a social media communication as it may be communicated to more than one recipient and contribute to the spread of information. Each electronic mail message has one or more designated recipient related to the communication at the discretion of the sender. Accordingly, electronic mail communications are targeted by the sender and each recipient has some degree of relevance.

Collaborative content is a category of electronic communication that includes publications with co-authors, co-owners, and/or collaborators. More specifically, collaborative content includes text and participants that are modeled to a structure. The participants, who are declared, share the same published content, which in one embodiment represents their interest and expertise. Accordingly, collaborative content exists in electronic form to enable multiple participants to contribute content to one or more products.

One feature in common among the social media communications identified herein is that each communication is created and shared among participants. Drawing a comparison to a directed acyclic graph, the participants may be designated as nodes and social links may be considered as edges. A document linkage commonly employs one or more hyperlinks for digital communications. Social linkage is different from document linkage, and lends itself to formation of a community. The concept of the community is vague and application dependent.

A multi-faceted view of social connections provides multi-dimensional insight into collaboration and allows one to know activities, who else is involved in activities, and levels of activeness within each activity. FIG. 1 is a diagram (100) illustrating a single facetted view of social connections among users, also referred to herein as participants. As shown, the view is centered on user u (110) and the social connections associated with user u (110). Specifically, seven users are shown linked to user u (110), including user a (120), user b (125), user c (130), user d (135), user e (140), user f (145) and user g (150). User a (120) is linked (122) to user u (110), but is not linked to any other user. Similarly, user b (125) is separately linked (128) to user u (110). However, there is no relationship between user a (120) and user b (125). User c (130) is separately linked to user u (110) and user d (135) at (132) and (138), respectively. Similarly, user d (135) is linked to user c (130), user u (110) and user e (140) at (142), (144), and (146), respectively. User e (140) is linked to user d (135), user u (110) and user f (145) at (146), (148), and (152); and user f (145) is linked to user e (140), user u (110) and user g (150) at (152), (154), and (156), respectively. Each of the links shown herein between two users has an associated line weight that reflects the associated relationship. A heavier line weight is reflective of a strong relationship, and a lighter line weight is reflective of a weak relationship. Accordingly, in a single facetted view each user may be linked to one or more users.

Figure 2:
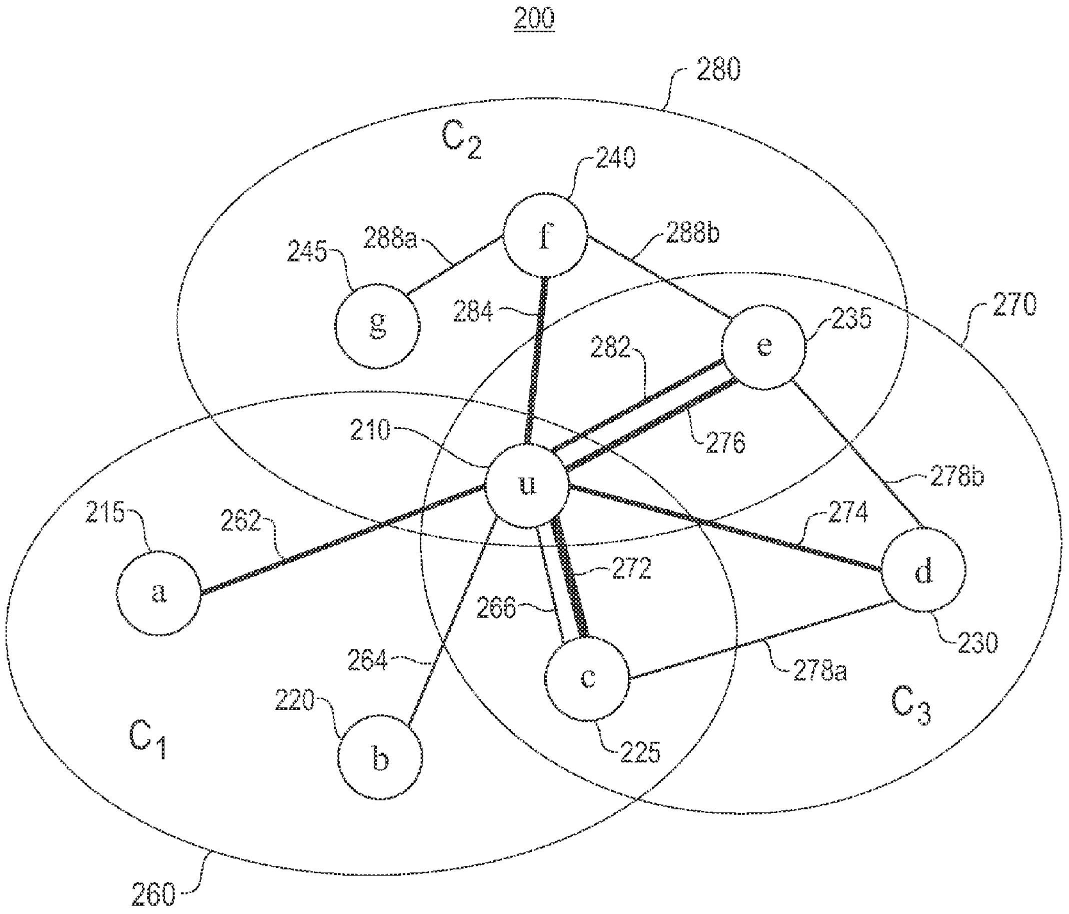
FIG. 2 depicts a multi-facetted view of social connections among users.

A multi-facetted view of relationships among users provides an understanding of what activities are important to each user and who is important in each defined activity. More specifically, a multi-facetted view provides a multi-dimensional definition of relationships among users recognizing the fact that a social document may represent a sharing activity within. FIG. 2 is a diagram (200) illustrating a multi-facetted view of social connections among users. As shown, there are eight users illustrated in the example shown herein. In one embodiment, there may be a different quantity of users, and as such, the invention should not be limited to the quantity illustrated. The users include user u (210), user a (215), user b (220), user c (225), user d (230), user e (235), user f (240), and user g (245). User a (215), user b (220), and user c (225) are each separately linked to user u (210) at (262), (264), and (266), respectively. At the same time, user a (215), user b (220), user c (225), and user u (210) are in a first defined community (260). User c (225), user d (230), and user e (235) are each separately linked to user u (210) at (272), (274), and (276), respectively. In addition, user c (225) and user d (230) share a link (278*a*), and user d (230) and user e (235) share a link (278*b*). At the same time, user c (225), user d (230), user e (235), and user u (210) are in a second defined community (270). User e (235), user f (240), and user g (245) are each separately linked to user u (210) at (282), (284), and (286), respectively, and user f (240) has a separate link (288) to user g (245). At the same time, user e (235), user f (240), user g (245), and user u (210) are in a third defined community (280). As shown, each community is defined from the perspective of a single user. Participants in a community are connected to a single user, but not necessarily with each other. Each separate link shown herein has an associated line weight, with the line weight reflecting the strength of a relationship between two users.

From a service provider's perspective, a deeper understanding of a user and associated social relationships enables provision of personalized services. For example, it may enable prioritization of incoming messages or feeds while mitigating information overload. With respect to FIG. 2, if the first community (260) and the third community (280) are equally important to user u (210) then a communication from user c (210) in the second community (270) has greater importance than a communication from user c (210) in the first community (260), as reflected by the associated weight of the link (272) as compared to link (266). Accordingly, the multi-facetted organization of users and associated communities provides insight into collaboration of different groups of users in different communities.

Knowing what community a user is involved with over time creates evidence to characterize the user at an abstract level. Working with multiple different groups of people on one topic may provide that the user is a leader or possesses an expertise in a specific area. Comparisons between topics of different activity areas can provide insight on characteristics of a user. Each activity area is a defined grouping of interconnected participants. A model is employed to profile a collaborator community, also referred to herein as an activity area. The model discovers communities in social media documents by considered context in both topics and collaboration groups. The basic rational is to understand that each social media document corresponds to a conversation session within one community, which is defined both by topics and by participants. More specifically, the topic(s) of a social media document is derived from the topic mixture of the community. The participants in an associated topic thread tend to actively participate. Accordingly, a social document may represent a sharing activity.

Figure 3:
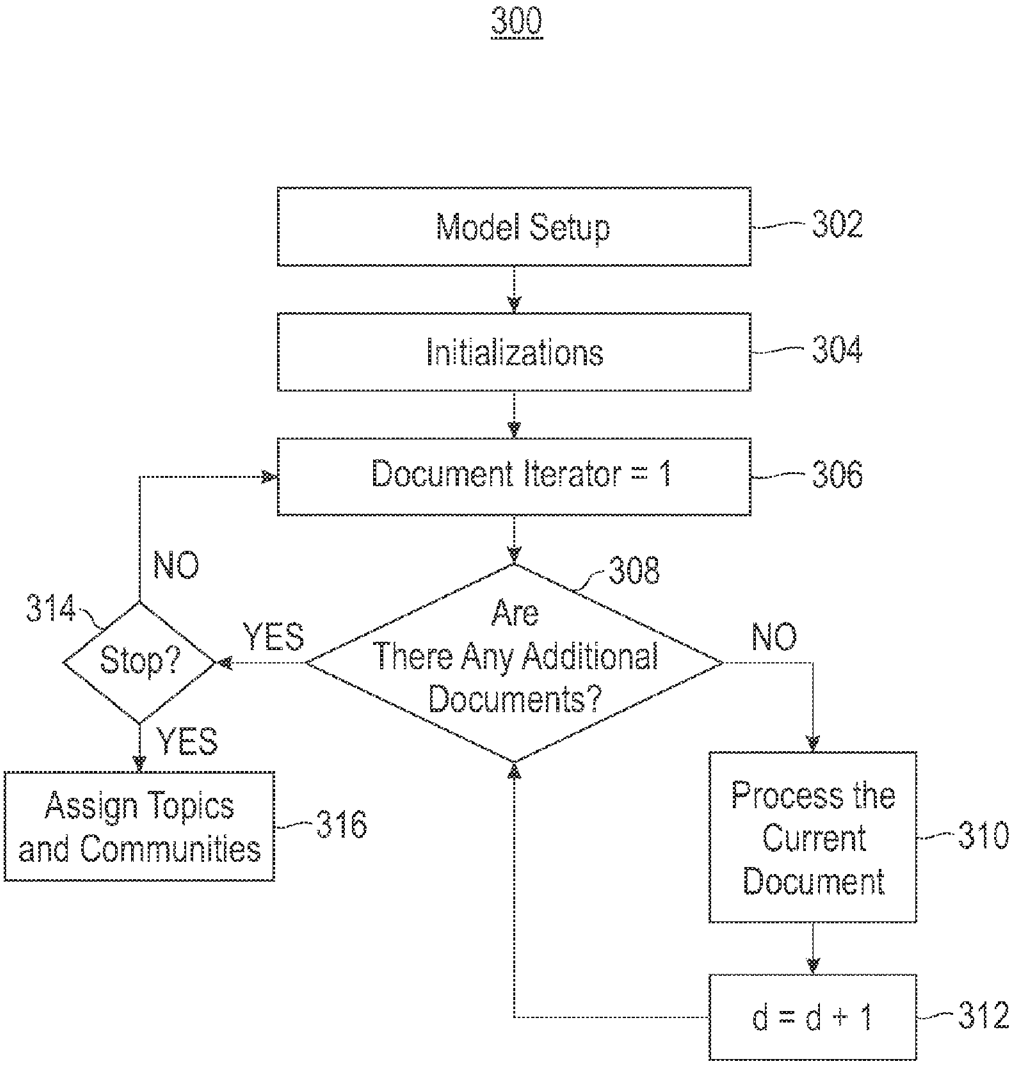
FIG. 3 depicts a flow chart illustrating a process for formation and profiling of communities formed from electronic communications.

FIG. 3 is a flow chart (300) illustrating a process for formation and profiling of communities formed from electronic communications. A document is assigned to a community where its likelihood of words and participants are maximized. Contents and social communities are modeled at the same time through a collaborator community model (302). The topic collaborator community consists of a mixture of topics, $\theta$, contributors, $\eta$ to the topics, and their interactions with other people in the same community. Details of the model are shown and described in FIG. 4.

Figure 4:
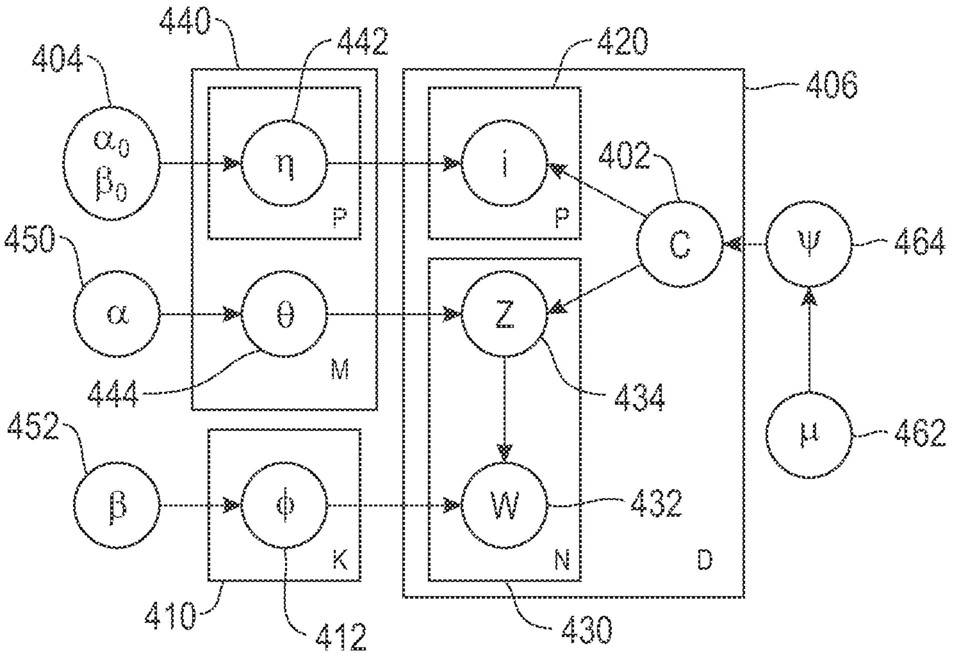
FIG. 4 depicts a block diagram illustrating a generative process of a latent community model.

FIG. 4 is a block diagram (400) illustrating a generative process of a latent community model. More specifically, the model is a variation of a latent Dirichlet allocation (LDA) and is a generative model that allows sets of observations to be explained by unobserved groups that explain why some parts of the data are similar. The model represents each document as a mixture of a small number of topics and each word in the document is attributable to one of the topics in the document. More specifically, the model addresses hidden assignment of communities where both topical similarity and associated people interactions are considered. Given a collection of documents (406), D, a topic community (402), C, is a mixture of people, P, (420) and the total number of words in all documents, N (430). The total number of words, N, (430) includes the identity of all words in all documents, W, (432) and the identity of all topics of all words in all documents, Z, (434). Unique words, $\phi$, (412) are a subset of the words, K, (410), and is an input parameter to the words in all the documents, W, (432). The number of documents, M, (440) is directly related to the mixture of people (420) and words in all the documents. More specifically, identified contributors, $\eta$, (442) are directly related to the mixture of people (420), and the topics, $\theta$, (444) are directly related to identity of all topics of all words in all documents, Z (434). The arrows between identified elements pertain to the dependencies.

As shown in the model of FIG. 4, there are three input parameters for the model, referred to herein as hyper parameters, including $\alpha$, $\beta$, and $\mu$. $\alpha$ (450) is an input parameter to the topics $\theta$ (444), $\beta$ (452) is an input parameter to the identified contributors, $\eta$, (442), and $\mu$ (462) is the input parameter to activeness $\psi$ (464). Each of the hyper parameters, $\alpha$, $\beta$, and $\mu$, are initialized (404), (304). Each of the hyper parameters defined herein are comprised of a plurality of sub-parameters. Specifically, $\alpha$ includes $\alpha_1, \alpha_2, \ldots \alpha_k$, $\beta$ includes $\beta_1, \beta_2, \ldots \beta_K$, and $\mu$ includes $\mu_1, \mu_2, \ldots \mu_K$. In one embodiment, the hyper parameters can be selected or assigned with default values. In one embodiment, the values are assigned as follows:

$$\alpha_1=\alpha_2=\alpha_k=1/K$$

$$\beta_1=\beta_2=\beta_V=1/V$$

$$\mu_1=\mu_2=\mu_C=1/C$$

and the initial values of $\alpha$ and $\beta$ represented as $\alpha_0$ and $\beta_0$, respectively, are represented by the integer one. The initializations at step (304) also include initialization of activeness, $\psi$, topics, $\theta$, and people, $\eta$, for each community. FIG. 5 is a chart (500) representing the initialization and maintenance of activeness (510), topics (520), and people (530) with respect to each community (540). Similarly, FIG. 6 is a chart (600) representing the initialization of unique words (610) with respect to each topic (620). FIG. 7 is a chart (700) representing initial values for activeness (710), topics (720), and people (730), with respect to community (740) and prior to looking at any training data. Similarly, FIG. 8 is a chart (800) representing initial values for unique words (810) with respect to topics (820) and prior to looking at any training data.

Following step (304), the variable representing the document is set to the integer one (306). It is then determined if there are any additional documents subject for evaluation and processing (308). A negative response to the determination at step (308) is followed by processing the current document, d, (310), after which the variable representing the document count is incremented (312). The processing of each document is repeated. As such, following step (312), the process returns to step (308). Once all of the documents have been processed, it is determining if the criterion for ending the document processing should be concluded (314). Document processing is set to conclude when either the maximum number of iterations has been reach or there has been a convergence among the communities, i.e. little change in the likelihood for the corpus. A negative response to the determination at step (314) is followed by a return to step (306), and a positive response to the determination at step (314) is followed by the current latent assignment of topics and communities (316).

As briefly described above at step (310), each document is processed. There are several aspects included in document processing, including but not limited to, initialization of latent variables, updating distributions with activeness, topics, contributors, and unique words, and outputting the status or assignment of topics and communities.

The following is pseudo code of the initialization of the latent variables, including sampling from uniform priors and tracking statistics for both community and topics:

```
For each document d,
    Sample a community
    For each token, j, within document d (j = 1, 2, . . . N_d)
        Sample the topic from community c's topic mixture as follows:
z_{d,j}^(0) ~ Multi(θ_{c1}^(0),θ_{c2}^(0),K,θ_{cK}^(0))
```

For each document, statistics are maintained for the variable represented in the latent community model shown in FIG. 4. The aspect of statistic maintenance is shown in FIGS. 9-11. More specifically, FIG. 9 is a chart (900) representing statistics for topics (910), people (920) and frequency of unique words assigned to each topic (930) for document d; FIG. 10 is a chart (1000) representing statistics for frequency of topics (1010) and (1020) for each community for document d; and FIG. 11 is a chart (1100) representing the total number of time each unique word (1110) is assigned to each topic (1120) for document d. In addition to updating the statistics represented in FIGS. 9-11, the activeness $\psi$, topics $\theta$, contributors $\eta$, and unique words $\phi$ are updated for subsequent sequential sampling. The following formulas demonstrate the manner in which the subsequent samplings are updated:

$$\Psi^{(1)} = (\Psi_1^{(1)}, \Psi_2^{(1)}, \ldots, \Psi_C^{(1)}, \quad \text{where } \Psi_C^{(1)} = \frac{\mu_c + D_c}{\sum_{c=1}^{C} \mu_c + D}, \forall c = 1, 2, \ldots, C$$

$$\theta_C^{(1)} = (\theta_{C1}^{(1)}, \theta_{C2}^{(1)}, \ldots, \theta_{CK}^{(1)}, \quad \text{where } \theta_{cK}^{(1)} = \frac{\alpha_k + c\cdot n_k}{\sum_{k=1}^{K}\alpha_k + \sum_{k=1}^{K} c\cdot n_k},$$

$$\forall c = 1, 2, \ldots, C; \forall_K = 1, 2, \ldots, K$$

$$\eta_{cp}^{(1)} = \frac{\alpha_0 + c\cdot m_p}{\alpha_0 + \beta_0 + D}, \forall c = 1, 2, K, C; \forall p = 1, 2, K, P$$

$$\phi_k^{(1)} = (\phi_{1k}^{(1)}, \phi_{2k}^{(1)}, \ldots, \phi_{Vk}^{(1)}),$$

$$\text{where } \phi_{vk}^{(1)} = \frac{\beta_v + n_{vk}}{\sum_{v=1}^{V}\beta_v + \sum_{v=1}^{V} n_{vk}} \forall k = 1, 2, \ldots, K$$

Sampling takes place to update the distributions with the statistics for activeness $\psi$, topics $\theta$, contributors $\eta$, and unique words $\phi$. In one embodiment, the sampling is in the form of Gibbs sampling as represented in the following pseudo code:

```
For iteration t = 1, 2, . . . , T
  For document d = 1, 2, . . . D
    For each token j within document d (j = 1, 2, . . . N_d)
      Sample a new topic for token j

        P(z = k | c) = θ̂_ck = (α_k + c·n_k) / (Σ_{i=1}^{K} α_i + Σ_{i=1}^{K} c·n_i), ∀ k = 1, 2, K, K.

      Sample (or choose) a new community for document d
  If converged, stop early.
```

Figure 12:
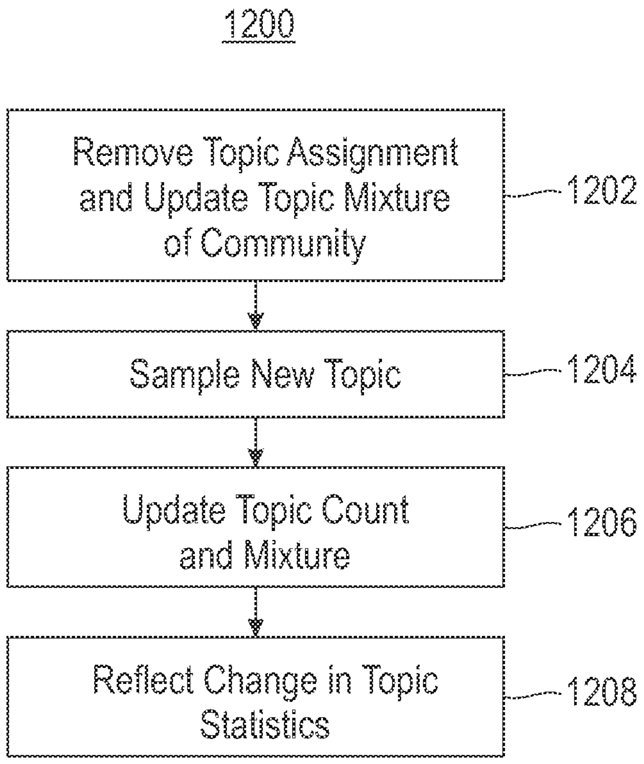
FIG. 12 depicts a flow chart illustrating the process and functionality for processing each token within a document, and more specifically for sampling a new topic.

FIG. 12 is a flow chart (1200) illustrating the process and functionality for processing each token within a document, and more specifically for sampling a new topic. First, the original topic assignment is removed and the topic mixture of the community is updated (1202). In one embodiment, the following is the mathematical representation of the removal and update at step (1202):

$$c\cdot n_k \leftarrow c\cdot n_k - 1, \theta_{ck}^{(t)} = \frac{a_k + c\cdot n_k}{\sum_{k=1}^{K} a_k + \sum_{k=1}^{K} c\cdot n_k}, \forall k = 1, 2, K, K$$

Following the update at step (1202), a new topic is sampled based on the updated topic mixture (1204). In one embodiment, the following is the mathematical representation of the sampling at step (1204):

$$z_{d,j}^{t+1} \sim \text{Multi}(\theta_{c1}^{(t)}, \theta_{c2}^{(t)}, K, \theta_{cK}^{(t)})$$

Thereafter, the community's topic count and mixture is updated (1206), which in one embodiment is represented in the following mathematical formula:

$$c \cdot n_{k'} \leftarrow c \cdot n_{k'} - 1, \theta_{ck}^{(t+1)} = \frac{a_k + c \cdot n_k}{\sum_{k=1}^{K} a_k + \sum_{k=1}^{K} c \cdot n_k}, \forall k = 1, 2, K, K$$

and, any change in the topic statistics is reflected (1208). The mathematical representation for reflecting changes in the type's topic statistics is as follows:

$$n_{vk} \leftarrow n_{vk} - 1, \Phi_{vk}^{(t+1)} = \frac{\beta_v + n_{vk}}{\sum_{v=1}^{V} \beta_v + \sum_{v=1}^{V} n_{vk}}$$

$$n_{vk'} \leftarrow n_{vk'} + 1, \Phi_{vk'}^{(t+1)} = \frac{\beta_v + n_{vk'}}{\sum_{v=1}^{V} \beta_v + \sum_{v=1}^{V} n_{vk'}}$$

Figure 13:
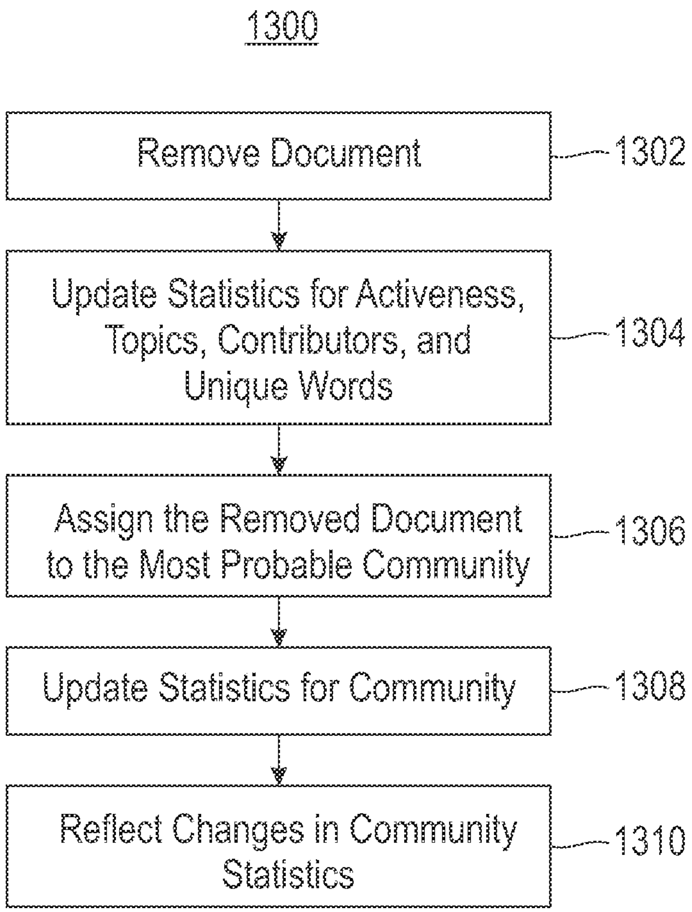
FIG. 13 depicts a flow chart illustrating a process for sampling a new community.

Each new community that is formed may be sampled. FIG. 13 is a flow chart (1300) illustrating a process for sampling a new community. First, a document is removed from its current community (1302) followed by updating the statistics for activeness $\psi$, topics $\theta$, contributors $\eta$, and unique words $\phi$ (1304), and assigning the removed document to the most probable community (1306). Thereafter, the statistics for community to which the document has been assigned is updated (1308), and changes are reflected in the participant's community statistics (1310). Accordingly, the aspect of formation of communities is an iterative and dynamic process and the statistics for activeness, topics, contributors, and unique words are updated following any changes to the communities.

Figure 14:
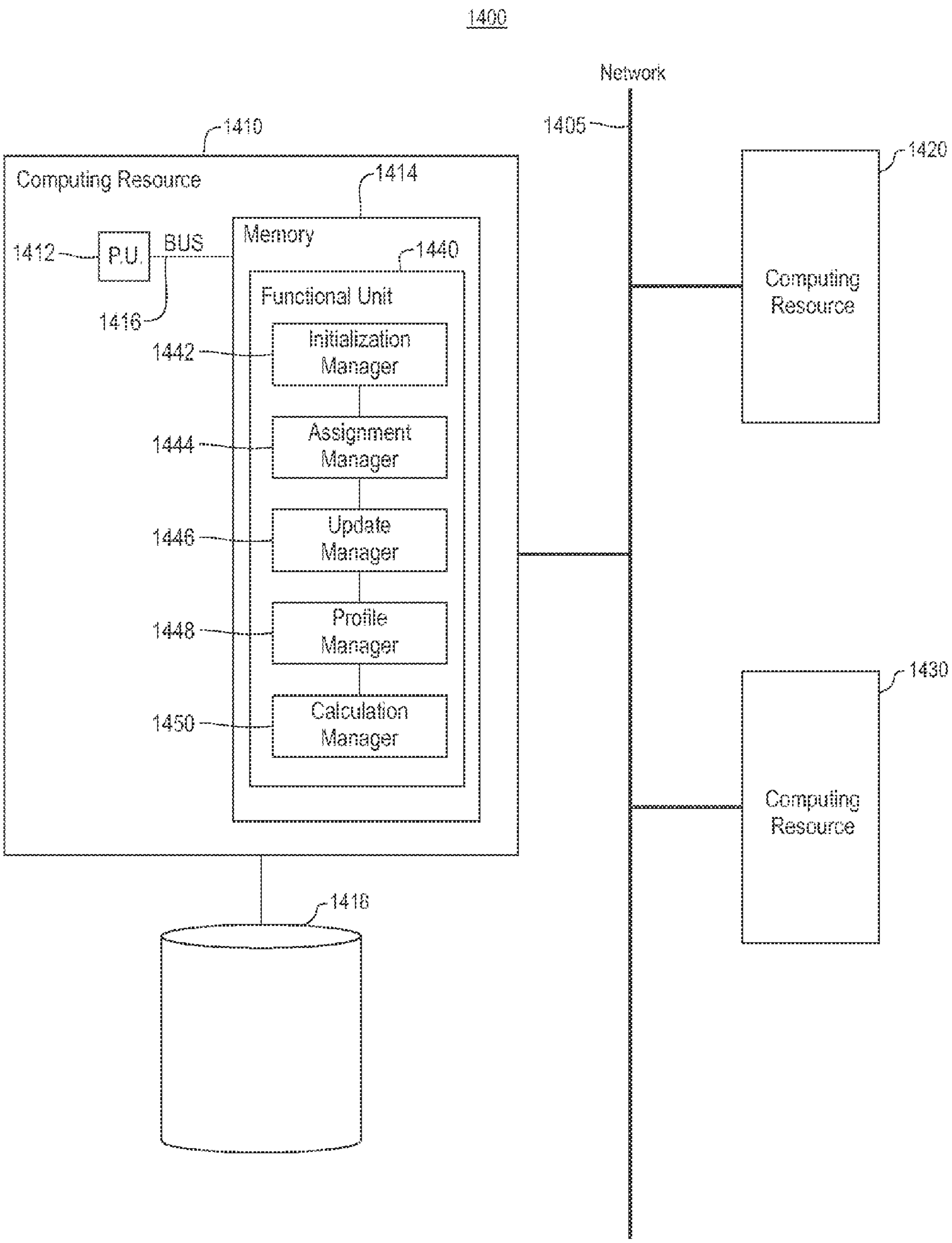
FIG. 14 depicts a block diagram illustrating tools embedded in a computer system to support a technique for formation of communities and dynamic modification and maintenance of the communities.

As shown in FIGS. 3-13, a method is provided to support a multi-faceted analysis for data clustering. Specifically, content is organized into communities which inherently include participants and associated topics. Membership in one of the communities is dynamically maintained and modified as documents and associated topics and participants are added or removed from any one of the formed communities. The content that is subject to being clustered may come in different forms, including but not limited to, electronic mail communications, social media content, collaborative documents, etc. FIG. 14 is a block diagram (1400) illustrating tools embedded in a computer system to support a technique for formation of communities based on the content and dynamic modification and maintenance of the communities. A computing resource (1410) is provided with a processing unit (1412) in communication with memory (1414) across a bus (1416), and in communication with data storage (1418). The computing resource (1410) is shown in communication with one or more computing resources (1420) and (1430) across a network (1405). As described above, data is gathered and analyzed to form communities. The network (1405) is employed as a communication conduit to send and receive data employed in the analysis. Communication among the computing resources is supported across one or more network connections (1405).

The computing resource (1410) is provided with a functional unit (1440) having one or more tools to profile data and to form communities from the profiled data. The functional unit (1440) is shown local to the computing resource (1410), and specifically in communication with memory (1424). In one embodiment, the functional unit (1440) may be local to any of the computing resources (1420) and (1430). The functional unit (1440) supports organization of data items into communities. The tools embedded in the functional unit (1440) include, but are not limited to, an initialization manager (1442), an assignment manager (1444), an update manager (1446), a profile manager (1448), and a calculation manager (1450).

The initialization manager (1442) functions to initialize two or more communities based on underlying communications. More specifically, the initialization manager (1442) initializes the communities based on one or more topics and two or more participants associated with the underlying communications. The participants include, but are not limited to, a sender and a recipient of the communication(s). The assignment manager (1444) is provided in communication with the initialization manager (1442). The assignment manager (1444), functions to assign each received community into one of the initialized communities. In one embodiment the assignment takes place iteratively. As the composition of the formed community changes, each of the communities is subject to change, in the form of addition to or removal from the community, and/or creation of a new community. To support the iterative aspect of the community, the update manager (1446), which is in communication with the assignment manager (1444), functions to update the characteristics of the formed communities. The update manager (1446) responds to assignment of the communication to the community by updating statistics associated with the community, including the distribution of participants and topic assignments for each word in the assignment communication(s). Once the statistics are updated, the profile manager (1448) creates a profile for each of the communities. Accordingly, the initialization manager (1442), assignment manager (1444), update manager (1446), and profile manager (1448) function together to iteratively manage the changing characteristics of the community.

As described above, statistics are maintained for each of the formed communities. Specifically, the calculation manager (1450) is provided to communicate with the profile manager (1448) to calculate a maximum likelihood of membership of a select communication with a select community. The calculation is based on a select topic work and participant distribution for the select community. Based on the calculated maximum likelihood value attainment of a threshold value, the assignment manager (1444) assigns the select communication to the select community. In one embodiment, the calculation employed by the calculation manager (1450) is based on a current topic of the communication being assigned and distribution of participants in the community. As described above, the formation and composition of communities is not static. Rather, each community may be formed and re-formed as communications are added to or removed from the community. The assignment manager (1444) may remove a previously assignment communication from a specific community after which the community subject to the removal is updated. Specifically, the update manager (1446) recalculates a topic and distribution of participants in the community that has been the subject to the removal. In addition to adding a communication to a community or removing a communication from a community, the assignment manager (1444) may remove a word from a community. Following this removal, the update manager (1446) removes topic statistics of the community from which the word has been removed and updates the word topic assignment for the community that has been subjected to the word removal. Accordingly, as specific elements are removed from or added to the communities, statistics associated with the community subject to change are updated to reflect the current status.

As described above, several managers are provided to support the functionality of initial formation and update of communities based on assignment of communications to a community. The managers include an initialization manager (1442), an assignment manager (1444), an update manager (1446), a profile manager (1448), and a calculation manager (1450). Each of these managers (1442)-(1450) are shown residing in the functional unit (1440) of the server (1410). Although in one embodiment, the functional unit (1440) and associated managers, respectively, may reside as hardware tools external to the memory (1414) of server (1410), they may be implemented as a combination of hardware and software, or may reside local to the one or more computing resources (1420) and (1430) in communication with server (1410) across a network (1405). Similarly, in one embodiment, the managers may be combined into a single functional item that incorporates the functionality of the separate items. As shown herein, each of the manager(s) are shown local to the server (1410). However, in one embodiment they may be collectively or individually distributed across a shared pool of configurable computer resources and function as a unit to profile data and to derive one or more communities from the profiled data. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
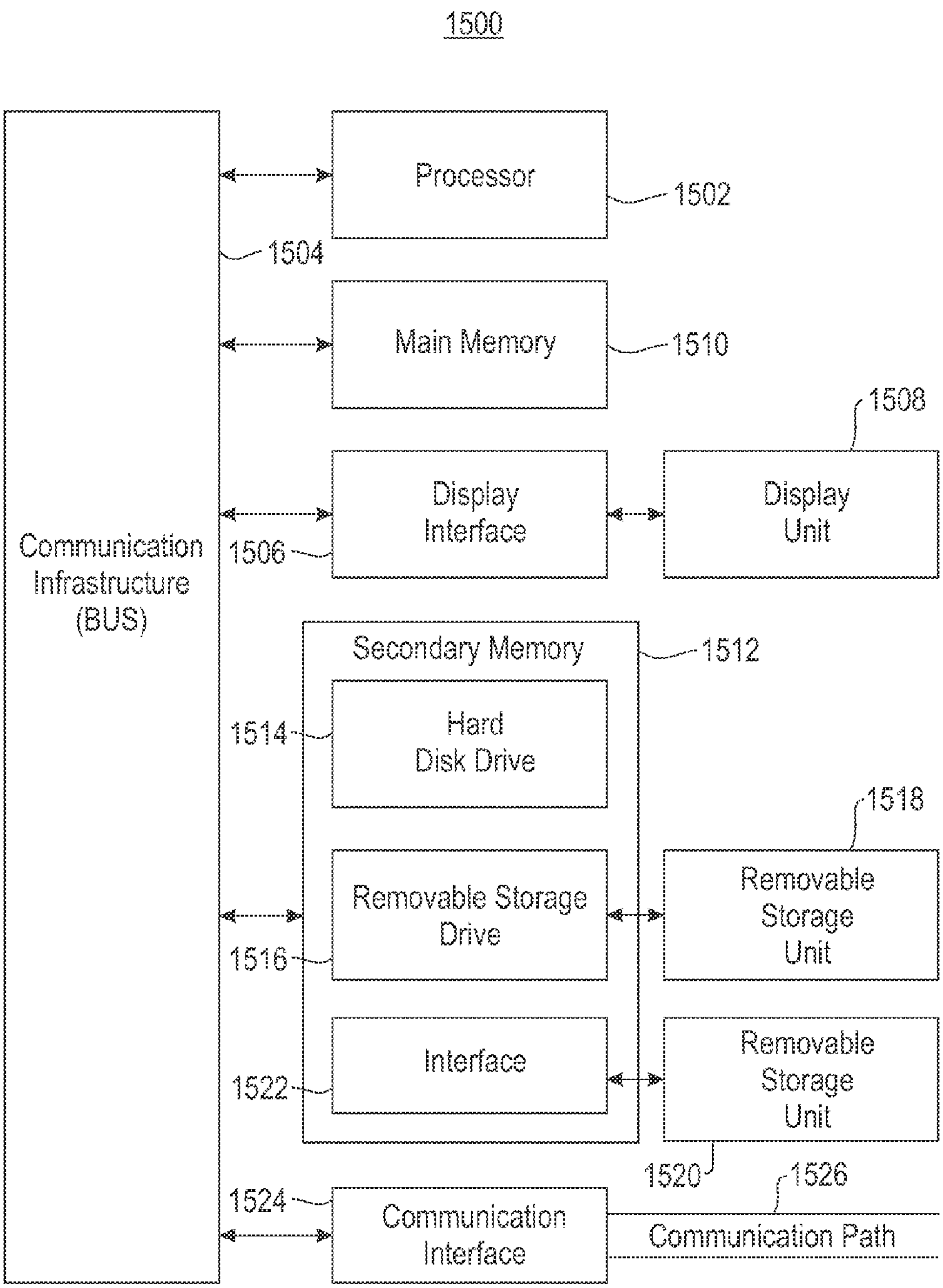
FIG. 15 depicts a block diagram showing a system for implementing an embodiment of the present invention.

Referring now to FIG. 15 is a block diagram (1500) showing a system for implementing an embodiment of the present invention. The computer system includes one or more processors, such as a processor (1502). The processor (1502) is connected to a communication infrastructure (1504) (e.g., a communications bus, cross-over bar, or network). The computer system can include a display interface (1506) that forwards graphics, text, and other data from the communication infrastructure (1504) (or from a frame buffer not shown) for display on a display unit (1508). The computer system also includes a main memory (1510), preferably random access memory (RAM), and may also include a secondary memory (1512). The secondary memory (1512) may include, for example, a hard disk drive (1514) and/or a removable storage drive (1516), representing, for example, a floppy disk drive, a magnetic tape drive, or an optical disk drive. The removable storage drive (1516) reads from and/or writes to a removable storage unit (1518) in a manner well known to those having ordinary skill in the art. Removable storage unit (1518) represents, for example, a floppy disk, a compact disc, a magnetic tape, or an optical disk, etc., which is read by and written to by removable storage drive (1516). As will be appreciated, the removable storage unit (1518) includes a computer readable medium having stored therein computer software and/or data.

In alternative embodiments, the secondary memory (1512) may include other similar means for allowing computer programs or other instructions to be loaded into the computer system. Such means may include, for example, a removable storage unit (1520) and an interface (1522). Examples of such means may include a program package and package interface (such as that found in video game devices), a removable memory chip (such as an EPROM, or PROM) and associated socket, and other removable storage units (1520) and interfaces (1522) which allow software and data to be transferred from the removable storage unit (1520) to the computer system.

The computer system may also include a communications interface (1524). Communications interface (1524) allows software and data to be transferred between the computer system and external devices. Examples of communications interface (1524) may include a modem, a network interface (such as an Ethernet card), a communications port, or a PCMCIA slot and card, etc. Software and data transferred via communications interface (1524) are in the form of signals which may be, for example, electronic, electromagnetic, optical, or other signals capable of being received by communications interface (1524). These signals are provided to communications interface (1524) via a communications path (i.e., channel) (1526). This communications path (1526) carries signals and may be implemented using wire or cable, fiber optics, a phone line, a cellular phone link, a radio frequency (RF) link, and/or other communication channels.

In this document, the terms “computer program medium,” “computer usable medium,” and “computer readable medium” are used to generally refer to media such as main memory (1510) and secondary memory (1512), removable storage drive (1516), and a hard disk installed in hard disk drive (1514).

Computer programs (also called computer control logic) are stored in main memory (1510) and/or secondary memory (1512). Computer programs may also be received via a communication interface (1524). Such computer programs, when run, enable the computer system to perform the features of the present invention as discussed herein. In particular, the computer programs, when run, enable the processor (1502) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to clustering of data, including, but not limited to, deriving one or more communities for the data and dynamic formation or re-formation of one or more communities in response to receipt of the new data.

Figure 16:
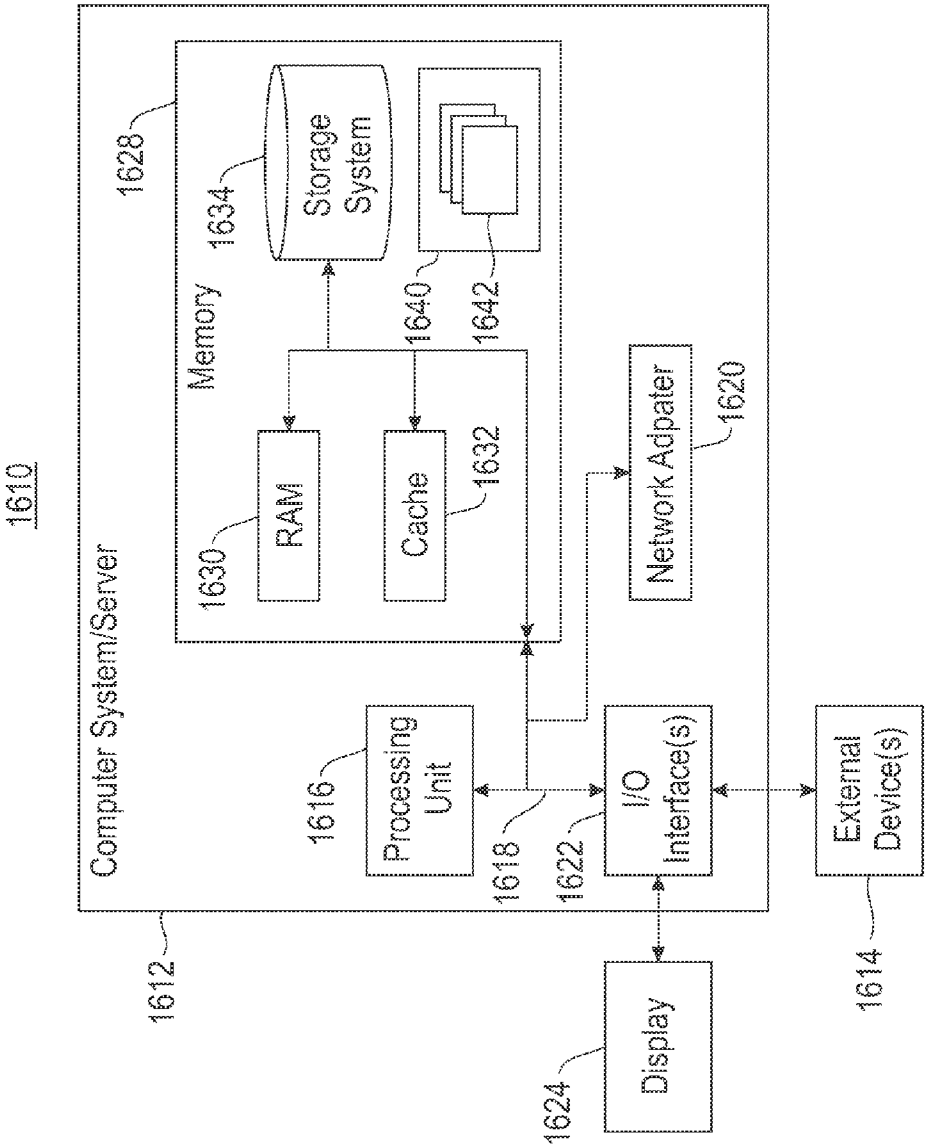
FIG. 16 depicts a cloud computing node according to an embodiment of the present invention.

In one embodiment, the clustering of data and derivation of communities may take place in a pool of shared resources, e.g. cloud computing environment. The cloud computing environment is service oriented with a focus on statelessness, low coupling, modularity, and semantic interoperability. At the heart of cloud computing is an infrastructure comprising a network of interconnected nodes. Referring now to FIG. 16, a schematic of an example of a cloud computing node is shown. Cloud computing node (1610) is only one example of a suitable cloud computing node and is not intended to suggest any limitation as to the scope of use or functionality of embodiments of the invention described herein. Regardless, cloud computing node (1610) is capable of being implemented and/or performing any of the functionality set forth hereinabove. In cloud computing node (1610) there is a computer system/server (1612), which is operational with numerous other general purpose or special purpose computing system environments or configurations. Examples of well-known computing systems, environments, and/or configurations that may be suitable for use with computer system/server (1612) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (1612) may be described in the general context of computer system-executable instructions, such as program modules, being executed by a computer system. Generally, program modules may include routines, programs, objects, components, logic, data structures, and so on that perform particular jobs or implement particular abstract data types. Computer system/server (1612) may be practiced in distributed cloud computing environments where jobs are performed by remote processing devices that are linked through a communications network. In a distributed cloud computing environment, program modules may be located in both local and remote computer system storage media including memory storage devices.

As shown in FIG. 16, computer system/server (1612) in cloud computing node (1610) is shown in the form of a general-purpose computing device. The components of computer system/server (1612) may include, but are not limited to, one or more processors or processing units (1616), a system memory (1628), and a bus (1618) that couples various system components including system memory (1628) to processor (1616). Bus (1618) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (1612) typically includes a variety of computer system readable media. Such media may be any available media that is accessible by computer system/server (1612), and it includes both volatile and non-volatile media, removable and non-removable media.

System memory (1628) can include computer system readable media in the form of volatile memory, such as random access memory (RAM) (1630) and/or cache memory (1632). Computer system/server (1612) may further include other removable/non-removable, volatile/non-volatile computer system storage media. By way of example only, storage system (1634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1618) by one or more data media interfaces. As will be further depicted and described below, memory (1628) may include at least one program product having a set (e.g., at least one) of program modules that are configured to carry out the functions of embodiments of the invention.

Program/utility (1640), having a set (at least one) of program modules (1642), may be stored in memory (1628) by way of example, and not limitation, as well as an operating system, one or more application programs, other program modules, and program data. Each of the operating systems, one or more application programs, other program modules, and program data or some combination thereof, may include an implementation of a networking environment. Program modules (1642) generally carry out the functions and/or methodologies of embodiments of the invention as described herein.

Computer system/server (1612) may also communicate with one or more external devices (1614), such as a keyboard, a pointing device, a display (1624), etc.; one or more devices that enable a user to interact with computer system/server (1612); and/or any devices (e.g., network card, modem, etc.) that enable computer system/server (1612) to communicate with one or more other computing devices. Such communication can occur via Input/Output (I/O) interfaces (1622). Still yet, computer system/server (1612) can communicate with one or more networks such as a local area network (LAN), a general wide area network (WAN), and/or a public network (e.g., the Internet) via network adapter (1620). As depicted, network adapter (1620) communicates with the other components of computer system/server (1612) via bus (1618). It should be understood that although not shown, other hardware and/or software components could be used in conjunction with computer system/server (1612). Examples, include, but are not limited to: microcode, device drivers, redundant processing units, external disk drive arrays, RAID systems, tape drives, and data archival storage systems, etc.

Figure 17:
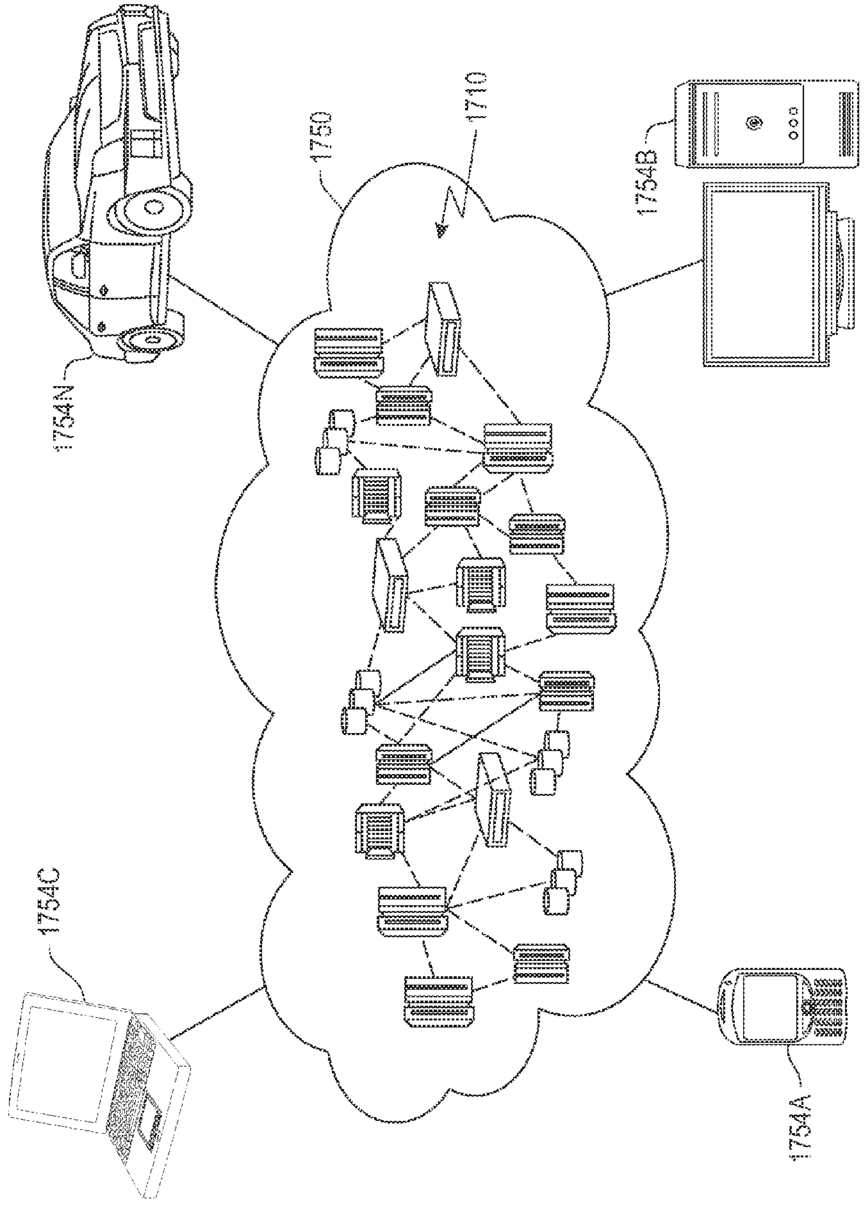
FIG. 17 depicts a cloud computing environment according to an embodiment of the present invention.

Referring now to FIG. 17, illustrative cloud computing environment (1750) is depicted. As shown, cloud computing environment (1750) comprises one or more cloud computing nodes (1710) with which local computing devices used by cloud consumers, such as, for example, personal digital assistant (PDA) or cellular telephone (1754A), desktop computer (1754B), laptop computer (1754C), and/or automobile computer system (1754N) may communicate. Nodes (1710) may communicate with one another. They may be grouped (not shown) physically or virtually, in one or more networks, such as Private, Community, Public, or Hybrid clouds as described hereinabove, or a combination thereof. This allows cloud computing environment (1750) to offer infrastructure, platforms and/or software as services for which a cloud consumer does not need to maintain resources on a local computing device. It is understood that the types of computing devices (1754A)-(1754N) shown in FIG. 17 are intended to be illustrative only and that computing nodes (1710) and cloud computing environment (1750) can communicate with any type of computerized device over any type of network and/or network addressable connection (e.g., using a web browser).

Figure 18:
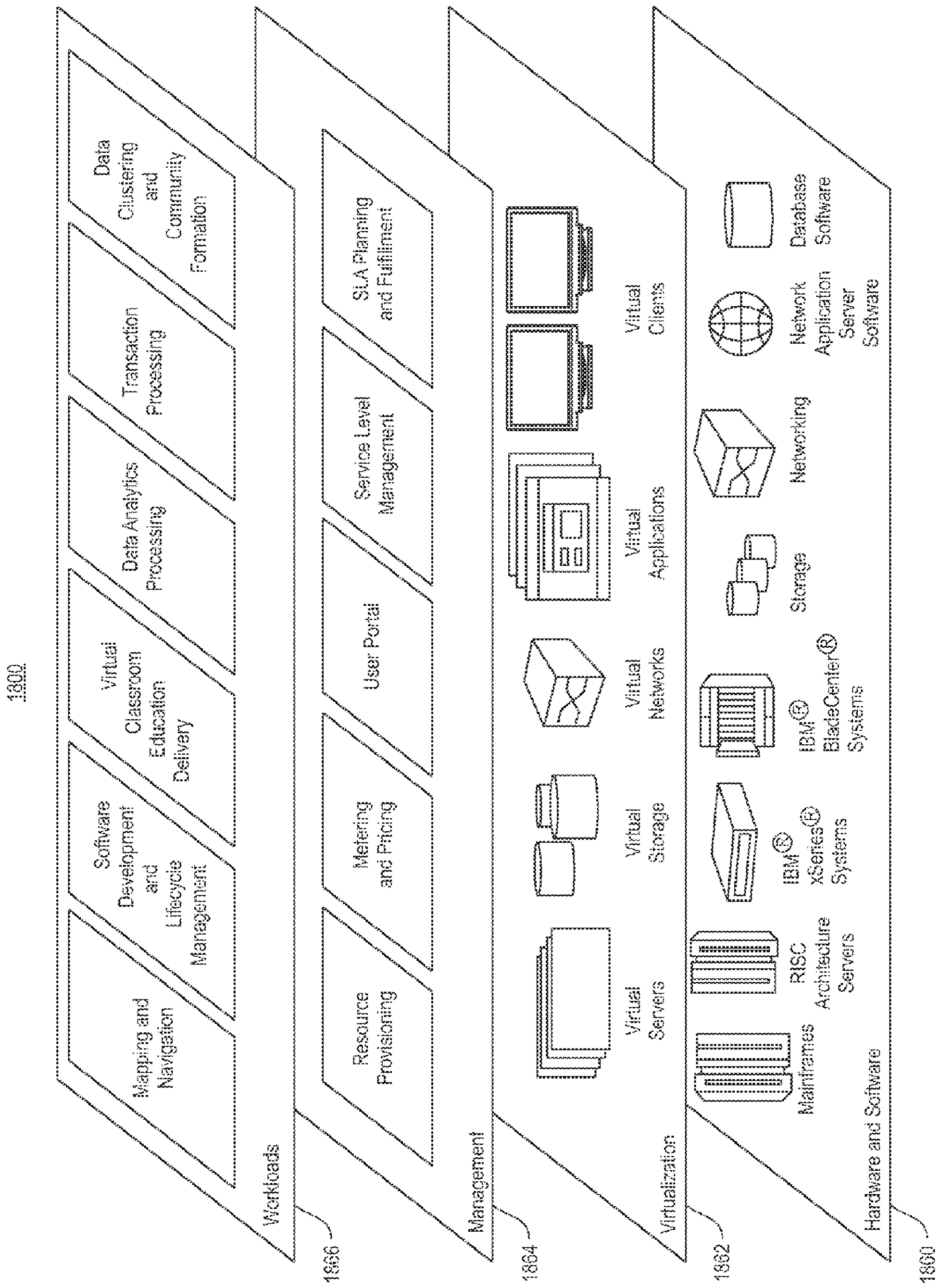
FIG. 18 depicts abstraction model layers according to an embodiment of the present invention.

Referring now to FIG. 18, a set of functional abstraction layers provided by cloud computing environment (1850) is shown. It should be understood in advance that the components, layers, and functions shown in FIG. 18 are intended to be illustrative only and embodiments of the invention are not limited thereto. As depicted, the following layers and corresponding functions are provided: hardware and software layer (1860), virtualization layer (1862), management layer (1864), and workload layer (1866). The hardware and software layer (1860) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1862) provides an abstraction layer from which the following examples of virtual entities may be provided: virtual servers; virtual storage; virtual networks, including virtual private networks; virtual applications and operating systems; and virtual clients.

In one example, management layer (1864) may provide the following functions: resource provisioning, metering and pricing, and user portal. The functions are described below. Resource provisioning provides dynamic procurement of computing resources and other resources that are utilized to perform jobs within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and jobs, as well as protection for data and other resources. User portal provides access to the cloud computing environment for consumers and system administrators.

Workloads layer (1866) provides examples of functionality for which the cloud computing environment may be utilized. Examples of workloads and functions which may be provided from this layer include, but is not limited to: mapping and navigation, software development and lifecycle management, virtual classroom education delivery, data analytics processing, job processing, and data clustering and community formation within the cloud computing environment. Data clustering provides cloud computing resource allocation and management such that data items are clustered and communities from the clustered data items are formed.

The data clustering and associated formation of communities areas may be extrapolated to function in a cloud computing environment. With respect to FIG. 14, each of the computing resources (1410), (1420), and (1430) may represent a data center with one or more embedded computing resources. Data may be gathered across the shared resources of the computing environment and employed to derive communities.

Alternative Embodiment

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A computer program product for use with electronic communication data, the computer program product comprising:

a computer readable non-transitory storage medium having computer readable program code embodied therewith, which when executed causes a computer to:

initialize a plurality of communities, each community being a defined grouping of interconnected participants and having an activeness, at least one topic, and at least two participants;

iteratively assign each received communication item into one of the communities;

in response to the assignment of the received communication item, update a statistical distribution of topics and a statistical distribution of participants in each of the communities, wherein the updating reflects the activeness;

iteratively update a topic assignment for each word from the assigned communication; and profile each of the communities based on the updated statistical distribution of topics and participants.

2. The computer program product of claim 1, further comprising computer readable program code configured to calculate a maximum likelihood of membership of a select communication with a select community, wherein the calculation is based on a select topic word and participant distribution for the community.

3. The computer program product of claim 2, further comprising computer readable program code configured to assign the select communication to the select community responsive to the calculated maximum likelihood meeting a threshold value.

4. The computer program product of claim 2, further comprising computer readable program code configured to calculate the maximized likelihood based on a current topic of the communication being assigned and distribution of participants in the communities.

5. The computer program product of claim 1, further comprising computer readable program code configured to remove a previously assigned communication from one of the communities and to update the community subject to the removal.

6. The computer program product of claim 5, further comprising computer readable program code configured to update a community profile for the community subject to the communication removal, and code to recalculate both a topic and distribution of the participants for the subject community.

7. The computer program product of claim 1, further comprising computer readable program code configured to remove a word from a community, including removal of topic statistics of the community from which the word has been removed.

8. The computer program product of claim 7, further comprising computer readable program code configured to update a word topic assignment for the community subject to the word removal.

9. A system comprising:

a shared pool of configurable resources, the shared pool including a physical host in communication with a plurality of physical machines, the physical host having a processing unit in communication with a memory module and data storage;

a functional unit local to the memory module and in communication with the processor, the functional unit having tools to support organization of data items, the tools comprising:

an initialization manager to initialize a plurality of communities, each community being a defined grouping of interconnected participants and having an activeness, at least one topic, and at least two participants;

an assignment manager in communication with the initialization manager, the assignment manager to iteratively assign each received data item into one of the initialized communities;

an update manager in communication with the assignment manager, the update manager to update a statistical distribution in each of the communities and respond to the assignment of the received data item, including a statistical distribution of topics and a statistical distribution of participants in each of the communities, a topic assignment for each word from the assigned data items in response to the assignment of the received data item, wherein the updating reflects the activeness; and a profile manager in communication with the update manager, the profile manager to profile each of the communities based on the updated statistical distribution of topics and participants.

10. The system of claim 9, further comprising a calculation manager in communication with the profile manager, the calculation manager to calculate a maximum likelihood of membership of a select communication with a select community, the calculation manager to base the calculation on a select topic word and participant distribution for the community.

11. The system of claim 10, further comprising the assignment manager to assign the select communication to the select community responsive to the calculated maximum likelihood meeting a threshold value.

12. The system of claim 10, further comprising the calculation manager to calculate the maximized likelihood based on a current topic of the communication being assigned and distribution of participants in the community.

13. The system of claim 9, further comprising the assignment manager to remove a previously assigned communication from one of the communities and update the community subject to the removal.

14. The system of claim 13, further comprising the update manager to update a community profile for the community, subject to removal of the assigned communication, and recalculate a topic and distribution of participants for the subject community.

15. The system of claim 9, further comprising the assignment manager to remove a word from a community, and the update manager to remove topic statistics of the community from which the word has been removed.

16. The system of claim 15, further comprising the update manager to update a word topic assignment for the community subject to the word removal.

* * * * *